United States Patent Office 3,389,164
Patented June 18, 1968

3,389,164
PROCESS FOR THE PREPARATION OF ARYL ESTERS OF CARBOCYCLIC CARBOXYLIC ACIDS
Gustav Renckhoff, Witten (Ruhr), and Hans-Leo Hülsmann, Rudinghausen, Germany, assignors to Chemische Werke Witten G.m.b.H., Witten (Ruhr), Germany
No Drawing. Filed July 31, 1964, Ser. No. 386,760
Claims priority, application Germany, Aug. 3, 1963, C 30,616
The portion of the term of the patent subsequent to Dec. 5, 1984, has been disclaimed
19 Claims. (Cl. 260—468)

ABSTRACT OF THE DISCLOSURE

Process for the preparation of aryl esters of carbocyclic mono- and polycarboxylic acids, or of mixed alkyl aryl esters of carbocyclic polycarboxylic acids, which comprises heating a primary or secondary $C_2$–$C_6$ alkanol ester of a carbocyclic monocarboxylic acid or a carbocyclic polycarboxylic acid with a phenolic compound in the presence of an effective ester radical interchange catalyst to temperatures above 160° C., while continuously removing the alkanol formed during the reaction from the reaction mixture. Yields of over 90% are obtained.

---

This invention relates to the preparation of aryl esters of carboxylic acids. More particularly, it relates to a process for the preparation of aryl esters of carbocyclic mono- and polycarboxylic acids. Even more particularly, the invention relates to a process for the preparation of aryl esters of mono- and polycarbocyclic carboxylic acids whose carboxyl groups are not ortho to each other. The process of the invention is also effective and relates to the preparation of mixed alkyl aryl esters of the said carbocyclic mono- and polycarboxylic acids.

For the preparation of carboxylic acid aryl esters, one had to resort heretofore to the reaction of carboxylic acid chlorides with the corresponding phenols, whereby the reaction is carried out either by using the isolated acid chloride in the presence of an alkali or a tertiary amine, or by heating the free carboxylic acid with the phenol at high temperatures in the presence of acid chloride-forming substances. Because of the corrosion difficulties encountered when working with acid chlorides and because of the formation of decomposition products, which require complicated purification operations, the process is expensive and uneconomical.

The direct esterification of carboxylic acids with phenols in the presence of very large amounts of water-binding substances, such as phosphorus pentoxide and polyphosphoric acids, has also been previously described. However, this reaction generally gives poor yields and leads to impure darkly colored products that are difficult to purify.

It is also known to prepare carboxylic acid aryl esters by reacting the carboxylic acids with diaryl carbonates in the presence of catalysts. However, this process does not eliminate working with acid chlorides, since phosgene must be used in the preparation of the diaryl carbonates.

It has already been proposed to prepare aryl esters of carbocyclic aromatic and aliphatic or alicyclic mono- and polycarboxylic acids by heating the methyl esters of these acids with monohydric phenols in the presence of ester radical interchange catalysts to temperatures above 160° C. and continuously removing the split-off methyl alcohol from the reaction mixture.

One of the objects of the present invention is to provide an improved process for the preparation of aryl and mixed alkyl aryl esters of carbocyclic mono- and polycarboxylic acids which overcomes the disadvantages and deficiencies of the prior art methods.

Another object of the present invention is to provide a process for the preparation of aryl and mixed alkyl aryl esters of carbocyclic mono- and polycarboxylic acids which may be carried out in an efficacious and economical manner.

A further object of the invention is to provide a process that yields aryl and mixed alkyl aryl esters of carbocyclic mono- and polycarboxylic acids in high purity and good yield.

A still further object of the invention is to provide a process for the preparation of aryl and mixed alkyl aryl esters of carbocyclic mono- and polycarboxylic acids which may be carried out easily and simply.

These and other objects of the present invention will become apparent to those skilled in the art from a reading of the following specification and claims.

In accordance with the present invention, it has been found that aryl esters of carbocyclic mono- or polycarboxylic acids, whose carboxyl groups are not in a neighboring position, i.e., not ortho, with respect to each other, may be obtained by heating the esters of these acids derived or prepared from alkanols containing 2 to 6 carbon atoms with monohydric phenols and/or phenols or naphthols which are substituted by alkyl and/or aralkyl groups in the presence of ester radical interchange catalysts to temperatures above 160° C. and removing the split-off alkanol continuously from the reaction mixture.

The alkanol esters that may be used as starting materials in the process according to the present invention are derived from carbocyclic mono- or polycarboxylic acids whose carboxyl groups are not in a neighboring position (ortho) with respect to each other. Particularly suitable for use herein are the alkanol esters derived from the aromatic mono- or polycarboxylic acids and their nuclear substitution products, for example, benzoic acid, the isomeric toluic acids, terephthalic acid, isophthalic acid, diphenyl dicarboxylic acids, diphenylmethane dicarboxylic acids, benzophenone dicarboxylic acids, naphthalene dicarboxylic acids, etc. From among the alkanol esters of alicyclic mono- or polycarboxylic acids, those of cyclohexane monocarboxylic acid or of the cyclohexane dicarboxylic acids may be effectively used as starting materials. As alkanol components for the alkanol esters serving as starting materials for the reaction according to the present invention, primarily the normal primary saturated aliphatic alkanols containing 2 to 6 carbon atoms are to be mentioned. However, the esters of secondary alkanols or unsaturated alkanols may also be employed if they have sufficient thermal stability at the reaction temperature. Esters of tertiary alkanols cannot generally be used since they decompose at the reaction temperature to give cleavage to olefins.

As phenolic components to be used in the present invention can be mentioned, for example, phenol, the isomeric cresols or xylenols, butylphenols, octylphenols, benzylphenols, β-naphthol, etc. Mixtures of the phenols may also be employed, whereby mixed aryl esters are obtained. These are of interest for some fields of application because of their relatively low melting points.

The reaction is preferably carried out at 180° to 250° C. The reaction temperature may, however, be higher if the thermal stability of the reactants permits it. Below 160° C., the reaction proceeds immeasurably slowly.

The reaction is generally carried out at atmospheric pressure. If low-boiling carboxylic acid esters are used as starting materials, it may possibly be necessary to work under excess pressure in order to obtain a reaction temperature which is within the range indicated. On the other hand, it may be advantageous, when using very high-boiling reaction components, to facilitate the removal of the cleaved-off alkanol by applying a vacuum to the reaction mixture. If esters of higher alkanols are used as starting materials, a highly effective distillation column may possibly have to be used for the separation of the cleaved-off alkanol from the phenol.

The ester radical interchange catalysts that may be used in the present invention are the acid or alkaline substances known in the art as suitable for such purposes, for example, polyphosphoric acids, acidic alkali-phosphates such as monosodium dihydrogen phosphate or dipotassium monohydrogen phosphate, alkali metal or alkaline earth metal hydroxides, tertiary amines, etc. Particularly advantageous as ester radical interchange catalysts are butyl titanate and the fatty acid salts of the metals of the Second Group of the Periodic Table, for example, calcium stearate or the zinc salt of the coconut preliminary run fatty acids. Other effective catalysts include tin compounds, particularly the fatty acid salts thereof such as tin stearate, which completely dissolve in the reaction mixtures. Antimony compounds, particularly antimony trioxide, are also good catalysts for the ester radical interchange since they yield particularly light reaction products.

The phenolic component is utilized in a molar amount at least equivalent to the number of alkyl ester groups to be reacted on the carboxylic acids employed according to the present invention. It is often of advantage to employ up to 6 moles of the phenol per equivalent of alkyl ester in order to accelerate the reaction. If desired, the excess of the phenol may be easily removed by distillation, after the termination of the reaction, under vacuum. When using the alkanol esters of aromatic di- and polycarboxylic acids, the reaction may also be run in such a manner that mixed alkyl aryl esters are obtained as the main products. These may then be separated without difficulty from the diaryl esters formed, and also from any possible unreacted starting material by known distillation or crystallization techniques based on the different boiling points and solubility properties of the different compounds.

For the preparation of the mixed alkyl aryl esters, either only as many equivalents of the phenolic component as there are reactive alkyl ester groups on the polycarboxylic acid alkyl esters are used or, when working with an excess of the phenolic component, the reaction is prematurely interrupted after cleavage of the alkanol amount calculated for the formation of the mixed ester. Preferably, 1 to 2 moles of phenolic component per alkyl ester group to be exchanged in the alkanol esters are utilized in making the mixed alkyl aryl esters.

The aryl esters of carbocyclic carboxylic acids prepared in accordance with the present invention possess technical importance as plasticizers and as intermediate products in organic syntheses. Of particular interest are the dicarboxylic acid diaryl esters which are valuable intermediates for making polycondensation products.

The following examples are given merely as illustrative of the present invention and are not to be construed as limiting.

Example I 450 parts by weight of benzoic acid ethyl ester (3 moles) is heated, with stirring, in a flask equipped with a fractionating column with 282 parts by weight of phenol (3 moles) in the presence of 2.5 parts by weight of butyl titanate as catalyst (0.55% by weight, relative to the amount of ester used). A slow nitrogen stream is passed through the apparatus during the reaction. Reaction takes place at a temperature of 200° to 230° C. The phenol is proportionately added in such a manner that the sump temperature does not drop below 200° C. during boiling under reflux. After 25 hours, 161 milliliters of distillate condenses in the condenser, the distillate having an ethanol content of about 90%. After distilling off a preliminary run at between 78° and 160° C. and a pressure of 11 torr, which contains phenol and 82.5 parts by weight of unreacted benzoic acid ethyl ester, 480 parts by weight of benzoic acid phenyl ester passes over at 163° C. and 9 torr. The melting point of the ester is 70.5° to 71.0° C., and the saponification number is 283 (calculated as 283). The yield amounts to 99% of the theoretical with respect to the amount of ethyl ester reacted and to 81% of the theoretical relative to the amount of ester employed.

Example II 328 parts by weight of benzoic acid isopropyl ester (2 moles) is ester radical interchanged, as described in Example I, with 188 parts by weight of phenol (2 moles) and 3.3 parts by weight of tin stearate as catalyst. The flask temperature remains at 200° to 240° C. After distillation of 126 parts by volume of isopropanol, corresponding to 93% of the amount calculated, the batch is distilled under vacuum. Initially, 15 parts by weight of unreacted benzoic acid isopropyl ester distills off at 160° C. and 13 torr, and thereafter 370 parts by weight of benzoic acid phenyl ester distills off at 165° to 168° C. and 12 torr. The ester melts at 70.5° to 71.0° C. The acid number of the aryl ester product is 0.7, and the saponification number is 283.5 (calculated at 283). The yield amounts to 98%, relative to the amount of benzoic acid isopropyl ester reacted. The degree of the reaction is 93.5%.

Example III 576 parts by weight of p-toluic acid butyl ester (3 moles) is ester radical interchanged in a flask equipped with a fractionating column while stirring with 282 parts by weight of phenol (3 moles) in the presence of 5.76 parts by weight of a mixture of equal parts of tin stearate and zinc stearate as catalyst, while a slow nitrogen stream is passed through the apparatus. The temperature during the ester radical interchange is 233° to 238° C. The phenol is proportionately added in such a manner that the flask temperature does not drop below 233° C. The cleaved-off butanol is distilled off at the top of the column at temperatures up to a maximum of 117° C. After distillation of the unreacted phenol and p-toluic acid butyl ester (184.5 parts by weight), 413.4 parts by weight of p-toluic acid phenyl ester passes over at 169° C. and at a pressure of 8 torr. Recrystallized from alcohol, the ester melts at 75° C. The acid number is 0.3, and the saponification number is 268 (calculated as 265). The yield of p-toluic acid phenyl ester amounts to 96%, relative to the amount of butyl ester reacted.

Example IV 743 parts by weight of dibutyl terephthalate (2.68 moles) is heated to reflux temperature for 18 hours with 250 parts by weight of phenol with the addition of 3.7 parts by weight of antimony trioxide. The cleaved-off butanol distills off at the top of the column at a maximum of 117° C. During the distillative preparation, 26 parts by weight of phenol and 206.5 parts by weight of unreacted dibutyl terephthalate pass over initially at temperatures up to 194° C. and at a pressure of 1 torr. Thereafter, 388 parts by weight of butylphenyl terephthalate distills off between 194° and 207° and 1 to 1.5 torr. This corresponds to a yield of 67.5%, relative to the amount of dibutyl ester reacted. The saponification number of the product is 374 (calculated as 376). As distillation residue, there remains 169.5 parts by weight of crude diphenyl terephthalate, corresponding to a 27.6% yield relative to the amount of dibutyl ester reacted. Dibutyl and diphenyl terephthalate may be added again to make up a new batch.

Example V 390 parts by weight of hexahydro-p-toluic acid propyl ester (2.12 moles) is ester radical interchanged, as described in Example I, with 235 parts by weight of phenol (2.5 moles) and 3.9 parts by weight of tin stearate as catalyst at reaction temperatures of from 200° to 219° C.

while the propanol is distilled off. After 40 hours, the batch is distilled under vacuum. After a preliminary run up to 125° C. and at 8 torr, giving 163 parts by weight of unreacted propyl ester, 252.5 parts by weight of hexahydro-p-toluic acid phenyl ester passes over at from 150° to 151.5° C. and 8 torr. The acid number of the ester is 1.1, and the saponification number is 260 (calculated as 257). The yield amounts to 94%, based on the amount of propyl ester reacted.

Example VI 284 parts by weight of p-toluic acid butyl ester (1 mole) is ester radical interchanged for 20 hours with 270 parts by weight (2.5 moles) of m-cresol with the addition of 1.9 parts by weight of antimony trioxide as catalyst while the butanol that is given off is continuously distilled over a column, whereby the reaction temperature rises from an initial 210° C. gradually to 240° C. 128 parts by weight of butanol distills off. This corresponds to an ester exchange of 86% of the theoretical yield. During the distillative preparation of the reaction mixture, and after distillation of the excess amount of m-cresol and the unreacted p-toluic acid butyl ester which may be returned into a new reaction batch, 370 parts by weight of p-toluic acid m-cresyl ester is obtained at a temperature of from 196° to 198° C. and at a pressure of 18 torr. The product has a saponification number of 250 (calculated as 249) and a melting point of 62° to 63° C. The yield amounts to 95% of the theoretical, based on the amount of p-toluic acid butyl ester reacted.

Example VII 417 parts by weight of isophthalic acid dibutyl ester (1.5 moles) and 324 parts by weight of m-cresol (3 moles) are ester radical interchanged for 22 hours, as in the preceding examples, with the addition of 2.1 parts by weight of antimony trioxide, whereby the reaction temperature rises from 212° to 250° C. and 143 parts by weight of butanol distills off. During the distillative preparation, 106 parts by weight of m-cresol and 85 parts by weight of unreacted dibutyl isophthalate initially pass over. Thereafter, 157 parts by weight of isophthalic acid butyl-m-cresyl ester distills off at from 225° to 280° C. and 10 torr as a colorless viscous oil having a saponification number of 362 (calculated as 360). The crude isophthalic acid di-m-cresyl ester remaining as residue may be returned into a new batch.

Example VIII 556 parts by weight (2 moles) of terephthalic acid dibutyl ester and 216 parts by weight (2 moles) of m-cresol are ester radical interchanged, as described in the preceding examples, with the addition of 1.4 parts by weight of antimony trioxide, whereby the reaction temperature rises from 240° to 290° C. and 95 parts by weight of butanol distills off within 18 hours. During the distillative preparation, and after a preliminary run in which 271 parts by weight of a mixture of unreacted m-cresol and terephthalic acid dibutyl ester is obtained, 177 parts by weight of terephthalic acid butyl-m-cresyl ester is obtained at the top of the column at a temperature of from 240° to 255° C. and at a pressure of 10 mm. Hg as a colorless viscous oil having a saponification number of 362.5 (calculated as 360). The crude terephthalic acid di-m-cresyl ester remaining as a residue is returned with the preliminary runs into a new batch.

Example IX 556 parts by weight (2 moles) of terephthalic acid dibutyl ester and 244 parts by weight (2 moles) of 3,5-dimethylphenol are ester radical interchanged as in the preceding examples, with the additional of 1.4 parts by weight of antimony trioxide, whereby the reaction temperature rises from 240° to 286° C. within 18 hours and 98 parts by weight of butanol distills off. During the preparation, 286 parts by weight of a mixture of unreacted xylenol and terephthalic acid dibutyl ester is initially obtained. Thereafter, 237 parts by weight of terephthalic acid butyl-3-5-dimethylphenyl ester distills off at from 260° to 270° C. and 10 torr as a viscous oil having the saponification number 346 (calculated as 345). The crude terephthalic acid di-3,5-dimethylphenyl ester remaining as residue is returned with the preliminary run into a new reaction batch.

The invention being thus described, it will be obvious that the same may be varied in many ways. Such variations are not to be regarded as a departure from the spirit and scope of the invention and all such modifications are intended to be included within the scope of the following claims.

We claim:

1. Process for the preparation of aryl esters of carbocyclic mono- and polycarboxylic acids which comprises heating a primary or secondary alkanol ester of an organic acid selected from the group consisting of carbocyclic monocarboxylic acids and carbocyclic polycarboxylic acids, the carboxyl groups of said polycarboxylic acids being other than ortho to each other, said alkanol ester containing 2 to 6 carbon atoms in the alkyl ester groups thereof, with a phenolic compound selected from the group consisting of phenol, naphthol and substituted phenols, said substituted phenols being substituted by one or more groups selected from the group consisting of alkyl and aralkyl radicals, said phenolic compound being used in a molar amount at least equivalent to the number of alkyl ester groups to be exchanged in the presence of an acidic alkaline or metallic salt ester radical interchange catalyst to temperatures above 160° C. to give an ester radical interchange and continuously removing the cleaved-off alkanol formed in the resultant ester radical interchange reaction from the reaction mixture.

2. Process according to claim 1, wherein the ester radical interchange is carried out at temperatures of from 190° to 260° C.

3. Process according to claim 1, wherein the ester radical interchange catalyst is a fatty acid salt of a metal of the Second Group of the Periodic System.

4. Process according to claim 1, wherein the ester radical interchange catalyst is a fatty acid salt of tin.

5. Process according to claim 1, wherein the ester radical interchange is carried out under pressure.

6. Process according to claim 1, wherein the ester radical interchange is carried out under a vacuum.

7. Process according to claim 1, wherein the ester radical interchange catalyst is selected from the group consisting of tin stearate, butyl titanate and antimony trioxide.

8. Process for the preparation of aryl esters of carbocyclic mono- and polycarboxylic acids which comprises heating a primary or secondary alkanol ester of an organic acid selected from the group consisting of carbocyclic monocarboxylic acids and carbocyclic polycarboxylic acids, the carboxyl groups of said polycarboxylic acids being other than ortho to each other, said alkanol ester containing 2 to 6 carbon atoms in the alkyl ester groups thereof, with a phenolic compound selected from the group consisting of phenol, cresol, xylenol, butylphenol, octylphenol, benzylphenol and β-naphthol, said phenolic compound being used in a molar amount at least equivalent to the number of alkyl ester groups to be exchanged, in the presence of an acidic, alkaline or metallic salt ester radical interchange catalyst to temperatures above 160° C. to give an ester radical interchange and continuously removing the cleaved-off alkanol formed in the resultant ester radical interchange reaction from the reaction mixture.

9. Process according to claim 8, wherein said ester radical interchange catalyst is selected from the group consisting of butyl titanate, calcium stearate, tin stearate, zinc stearate, the zinc salt of the coconut fatty acids and antimony trioxide.

10. Process according to claim 9, wherein said organic acid is selected from the group consisting of isophthalic and terephthalic acid.

11. Process for the preparation of mixed alkyl aryl esters of carbocyclic polycarboxylic acids which comprises heating a primary or secondary alkanol ester of a carbocyclic polycarboxylic acid, the carboxyl groups of which are other than ortho to each other, said alkanol ester containing 2 to 6 carbon atoms in the alkyl ester groups thereof with 1 to 2 moles, per alkyl ester group to be exchanged, of a phenolic compound selected from the group consisting of phenol, naphthol and substituted phenols, said substituted phenols being substituted by one or more groups selected from the group consisting of alkyl and aralkyl radicals in the presence of an acidic, alkaline or metallic salt ester radical interchange catalyst to temperatures above 160° C. to give a partial ester radical interchange, continuously removing from the reaction mixture the amount of cleaved-off alkanol formed in the resultant ester radical interchange reaction calculated for the formation of the mixed alkyl aryl ester, and then recovering the mixed alkyl aryl ester from the reaction mixture.

12. Process according to claim 11, wherein the recovery of the mixed alkyl aryl ester is carried out by distillation.

13. Process according to claim 11, wherein the recovery of the mixed alkyl aryl ester is carried out by crystallization.

14. Process according to claim 11, wherein the ester radical interchange is carried out at temperatures of from 190° to 260° C.

15. Process according to claim 11, wherein the ester radical interchange catalyst is a fatty acid salt of a metal of the Second Group of the Periodic System.

16. Process according to claim 11, wherein the ester radical interchange catalyst is a fatty acid salt of tin.

17. Process according to claim 11, wherein the ester radical interchange is carried out under pressure.

18. Process according to claim 11, wherein the ester radical interchange is carried out under a vacuum.

19. Process according to claim 11, wherein the ester radical interchange catalyst is selected from the group consisting of tin stearate, butyl titanate and antimony trioxide.

References Cited

UNITED STATES PATENTS 2,422,016  6/1947  Hull et al. _____ 260—479

FOREIGN PATENTS 314,646  7/1929  Great Britain.

OTHER REFERENCES

Wilfong: J. Polymer Science, vol. 54, pp. 388–389, 1961.

Korshak et al.: Izvest. Akad. Nauk. S.S.S.R. Otdel, Khim. Nauk., pp. 614–617, 1958.

LORRAINE A. WEINBERGER, *Primary Examiner.*

T. GALLOWAY, *Assistant Examiner.*